(No Model.)

E. M. CARHART.
SUPPORT FOR ELECTRIC CABLES.

No. 324,225. Patented Aug. 11, 1885.

Witnesses:
Wm. G. Lipsey
Edward T. Roche

Inventor:
Edwin M. Carhart,
by his attorneys,
Gifford & Brown

UNITED STATES PATENT OFFICE.

EDWIN M. CARHART, OF PROVIDENCE, RHODE ISLAND, ASSIGNOR OF ONE-HALF TO EDWIN HOLMES, OF BROOKLYN, NEW YORK.

SUPPORT FOR ELECTRIC CABLES.

SPECIFICATION forming part of Letters Patent No. 324,225, dated August 11, 1885.

Application filed August 12, 1884. (No model.)

*To all whom it may concern:*

Be it known that I, EDWIN M. CARHART, of Providence, in the county of Providence and State of Rhode Island, have invented a certain new and useful Improvement in Supports for Electric Cables, of which the following is a specification.

My improvement relates to electric cables which are suspended in the air from a strong supporting wire or bunch of wires.

The improvement consists in a clip for supporting a cable from a suspending wire or bunch of wires made of sheet metal, and consisting of two separate approximately circular resilient portions having hooks or catches, whereby they may be secured together after having been placed about the cable and supporting-wire.

Figure 1:
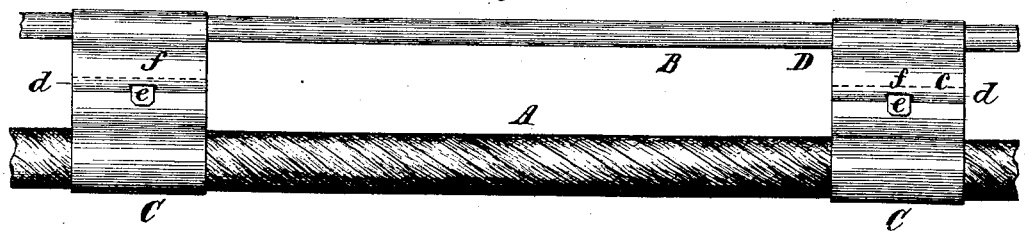
Figure 2:
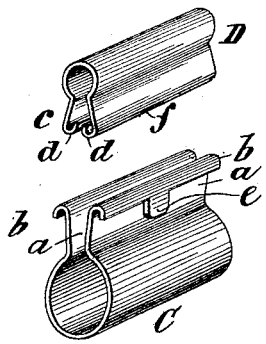

In the accompanying drawings, Figure 1 is a side view of a portion of an electric cable, a portion of a supporting wire or bunch of wires, and clips embodying my improvement. Fig. 2 is a perspective view of a form of clip embodying the improvement made in two separate parts, the parts being shown as separated, and Fig. 3 is a transverse section of this clip with its parts united.

Similar letters of reference designate corresponding parts in all the figures.

A designates an electric cable of any approved construction, and B designates a strong wire or bunch of wires from which this cable is suspended at intervals by clips.

Figure 3:

I will first describe the clip which is illustrated in Figs. 1, 2, and 3. It consists, essentially, of a portion, C, which is of suitable size to grasp the cable A, and a portion, D, which is of proper size to fit around the supporting wire or bunch of wires B. This clip is made in two parts. The lower part comprises the portion C, which grasps the cable A, and two arms, *a*, extending upwardly therefrom and terminating in hooks *b*, which are here shown as extending outwardly. The upper part comprises the portion D, which fits around the wire or bunch of wires B, and two arms, *c*, extending downwardly and terminating in hooks *d*, which are here shown as extending inwardly. The hooks *b* and *d* are adapted to engage one with another.

The parts of this clip will preferably be made of sheet metal, although the upper part may be made of various other materials. The lower part may be spread apart to slip it over the cable A, and then bent or allowed to bend into its original condition, as indicated by the bold lines of said figure. The upper part will be slipped over the wire or bunch of wires B. When the two parts are thus applied, their hooks *b d* will be engaged.

In order to prevent any accidental disengagement of the parts, I preferably provide both the arms *a* of the lower part with a downwardly-extending hook, *e*, and the upper part with slots *f* adapted to receive said hooks *e*. The parts will then be fitted together by pressing the arms *a* of the lower part up between the arms *c* of the upper part, or the arms *c* of the upper part down over the arms *a* of the lower part, and then the parts will be pulled so as to cause the hooks *e* to enter the slots *f* and the hooks *b* and *d* to engage. The parts may then, if desirable, although not necessarily, be clinched.

Clips embodying my improvement may be used at any desired distances apart.

What I claim as my invention, and desire to secure by Letters Patent, is—

1. A clip for supporting a cable from a suspending wire or bunch of wires, made of sheet metal, and consisting of two separate approximately circular resilient portions having hooks or catches on the same, whereby they may be secured together after having been placed about the cable and supporting wire or bunch of wires, substantially as specified.

2. A clip consisting of the portion C, provided with hooks *b*, and the portion D, provided with hooks *d*, substantially as specified.

3. A clip consisting of the portion C, provided with hooks *b* and the hooks *e*, and the portion D, provided with the hooks *d* and the slots *f*, substantially as specified.

EDWIN M. CARHART.

Witnesses:
RICHARD D. KNIGHT,
O. B. HAUXHURST,
J. W. WHITE.